W. J. JAMISON.
FISH BAIT.
APPLICATION FILED JAN. 29, 1919.
1,316,040.
Patented Sept. 16, 1919.
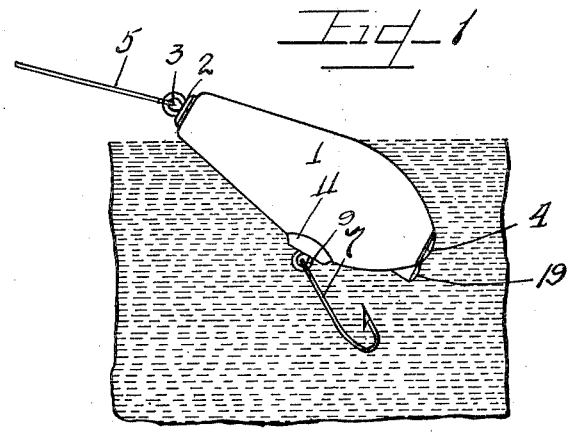
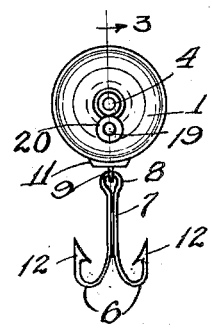
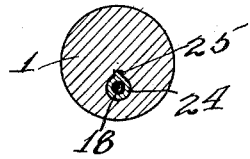
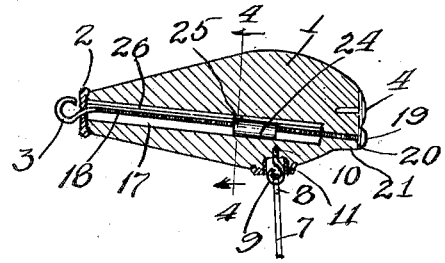
Witnesses
J. W. Angell
Charles W. Hills Jr.
Inventor
William J. Jamison
by Charles W. Hills
Atty.

UNITED STATES PATENT OFFICE.

WILLIAM J. JAMISON, OF CHICAGO, ILLINOIS.

FISH-BAIT.

1,316,040.　　　　Specification of Letters Patent.　　Patented Sept. 16, 1919.

Application filed January 29, 1919.　Serial No. 273,755.

*To all whom it may concern:*

Be it known that I, WILLIAM J. JAMISON, a citizen of the United States, and a resident of the city of Chicago, in the county of Cook and State of Illinois, have invented certain new and useful Improvements in Fish-Bait; and I do hereby declare that the following is a full, clear, and exact description of the same, reference being had to the accompanying drawings, and to the numerals of reference marked thereon, which form a part of this specification.

My invention has reference more particularly to a fish lure comprising a float with hooks attached and adapted for casting or trolling, the float resting in the water in such a position that when it is drawn therethrough it is accompanied by a wiggling motion similar to that of a fish struggling at the surface of the water for air, and gives the device the appearance of an animated object.

An object of my invention is to provide a simple and inexpensive fish lure adapted to be drawn through the water to attract fish thereto.

Another object of my invention is to provide a fish lure comprising a float having a weight and hooks on the under side and which, when the lure is drawn through the water, is caused to wiggle like a fish at the surface of the water struggling for air.

Another object of my invention is to provide a fish lure comprising an elongated float with an adjustable weight for regulating the inclination which the float assumes in the water whereby the action thereof as it is drawn through the water may be varied as desired.

Another object of my invention is to provide a fish lure comprising a float and hooks suspended therefrom so as to avoid catching on or entanglement with weeds and other material that may be in the water.

My invention also has other important objects which will appear from the following specification and accompanying drawings, in which I have described and illustrated my invention in a preferred form.

On the drawings:

Figure 1 is a side view of a fish lure embodying the features of the present invention.

Fig. 2 is a rear end view of the lure.

Fig. 3 is a section on the line 3—3 of Fig. 2.

Fig. 4 is a section on the line 4—4 of Fig. 3.

As shown on the drawings:

The reference numeral 1 indicates a float of elongated shape and made of wood, cork or other light material so as to float on the surface of the water. This float is painted a suitable color or colors to attract fish and has a cap or plate 2 at the front end through which a screw eye 3 is inserted in the float, and a cap or tip 4 may also be secured at the rear end of the float. The line 5 is attached to the lure by means of the screw eye 3, so as to pull the lure through the water.

One or more hook elements are secured to the under side of the float and these, together with a weight which is also provided in the float are arranged to maintain the float in an inclined position in the water, substantially as shown in Fig. 1, with the hook elements depending therefrom.

These hook elements preferably consist of a pair of hooks 6, having the shanks 7 paralleled and provided with an integral loop 8 at the connected upper ends, which loop is loosely engaged in an eye 9 of a screw 10, which is threaded into the float. A ferrule or thimble 11 may be provided around the screw at the point where it is inserted in the float. The points or barbs 12, of this duplex hook are spread apart as shown in Fig. 2, and the hook suspended from the eye 9, so as to have the points or barbs at the rear as shown in Fig. 1, so that as the lure is drawn through the water, any weeds or matter in the water upon which the hooks might catch, engage the shank of the hook and tend to lift the hook and slide thereunder without becoming entangled with the barbs.

The disposition of the weight depends upon the number and placing of the hooks and the manner in which it is desired to have the lure ride upon or in the water or the wiggling effect which it is wished to obtain. In a lure, as shown, having only a single hook element, the hook is preferably located somewhat back of the longitudinal center of the float as shown.

The weight may be located in a tubular opening 17 extending lengthwise of the float from the center at the front end of the float and at an angle to the longitudinal axis of the float so as to be at one side of the float. A threaded stem 18 extends lengthwise through this opening and through the closed rear end of the opening 17, and is headed at 19 and has the head engaged against a washer or small plate 20, on the shoulder 21, at the rear end of the float. The front end of the threaded stem 18 projects through the front end plate or cap 2 of the float and has an eye 3 engaging the outer face of the plate 2, to coöperate with the opposite headed end 19, to hold the stem 18 in the float and enable the stem to be turned. The line is attached to the loop or eye 3.

Mounted to slide in the opening 17 is a weight 24, which is threaded on the stem 18, so as to be adjusted longitudinally in the opening 17 by turning the stem 18, and this weight is held from turning by a radial lug 25, which fits in a groove or keyway 26, extending along the side of the opening 17. This float may be provided with a single hook element 6, as shown, or a plurality thereof and the weight adjusted to vary the inclination of the float in the water and consequently the wiggling thereof as it is drawn along through the water.

The operation is as follows:

The line is secured to the eye at the forward end of the fish lure and the lure is drawn through the water by casting or trolling. By reason of the disposition of the hook or hooks and the weight, the hooks hang loosely from the under side of the float and the float assumes an inclination in the water which, as it is drawn through the water, tends to lift the device. This results, especially in water that ripples or waves slightly, in a continual wiggling of the lure after the fashion of a fish struggling at the surface of the water for air, and gives it the appearance of possessing life and animation and furthers the deception which is intended to attract the fish.

In the structure shown in Figs. 7 and 8, the weight being adjustable, may be moved lengthwise in the opening 17 by turning the threaded stem 18 to vary the position of the weight in the float so that the latter will assume the desired degree of inclination in the water to secure the best results.

While I have shown and described my invention in a preferred form, I am aware that various changes and modifications may be made therein without departing from the principles of my invention, and I therefore do not purpose limiting the patent granted hereon otherwise than necessitated by the prior art.

I claim as my invention:

1. In a fish lure, the combination of an elongated float having means at the forward end for attaching a pulling line thereto, a weight for causing the float to assume an inclined position in the water, means for adjusting the weight to vary the inclination of the float, and a hook depending from the float.

2. In a fish lure, the combination of an elongated float having a weight therein at one side of the longitudinal axis of the float and movable lengthwise thereof, a threaded member for adjusting the weight lengthwise of the float, a hook depending from the float, and means at the forward end of the float for attaching a line whereby the float may be drawn through the water.

In testimony whereof I have hereunto subscribed my name in the presence of two subscribing witnesses.

WILLIAM J. JAMISON.

Witnesses:
E. M. GILES,
FRED E. PAESLER.